(12) United States Patent
Saha et al.

(10) Patent No.: US 11,316,469 B1
(45) Date of Patent: Apr. 26, 2022

(54) PHOTOVOLTAIC PANEL CLEANING SYSTEM

(71) Applicant: Green Grid Inc., San Ramon, CA (US)

(72) Inventors: Chinmoy Prosun Saha, San Ramon, CA (US); Jeffrey Scott Pickles, Sunnyvale, CA (US)

(73) Assignee: Green Grid, Inc., San Ramon, CA (US)

( * ) Notice: Subject to any disclaimer, the term of this patent is extended or adjusted under 35 U.S.C. 154(b) by 0 days.

(21) Appl. No.: 17/124,107

(22) Filed: Dec. 16, 2020

(51) Int. Cl.
*H02S 40/10* (2014.01)
*B08B 1/00* (2006.01)
*B08B 11/04* (2006.01)
*B08B 5/02* (2006.01)

(52) U.S. Cl.
CPC .............. *H02S 40/10* (2014.12); *B08B 1/001* (2013.01); *B08B 1/008* (2013.01); *B08B 5/02* (2013.01); *B08B 11/04* (2013.01)

(58) Field of Classification Search
None
See application file for complete search history.

(56) References Cited

U.S. PATENT DOCUMENTS

| 8,771,432 | B2 | 7/2014 | Meller et al. |
| 2014/0109334 | A1 | 4/2014 | Saraf |
| 2019/0353406 | A1 | 11/2019 | Simonette et al. |

FOREIGN PATENT DOCUMENTS

| CN | 110756518 A | 2/2020 |
| CN | 111342766 A | 6/2020 |
| EP | 2048455 A2 | 4/2009 |
| WO | WO-2019215756 A1 | 11/2019 |

OTHER PUBLICATIONS

Fracsun Inc., "ARES Soiling Measurement Station." Retrieved from <https://fracsun.com/products>.
RST CleanTech Solutions Ltd., "RST CleanTech—Minimum Dirt, Maximum Production." Retrieved from <https://www.rst-cleantech.com/en/>, submitted 2020.

*Primary Examiner* — Eric W Golightly
(74) *Attorney, Agent, or Firm* — Harness Dickey & Pierce PLC

(57) ABSTRACT

In accordance with the present invention, a panel cleaning system is provided. In one aspect, the panel cleaning system includes a storage tank containing pressurized air, first and second linear actuators, and a panel-cleaning device wherein the pressurized air contained in the storage tank operates the first and second actuators and the panel-cleaning device to clean PV panels. A further aspect includes sensors associated with the first and second actuators and panel-cleaning device and configured to scan and detect fluid and debris on the PV panels to be removed. Another aspect provides sensors associated with a panel cleaning system and a programmable controller or processor configured to execute instructions stored in a nontransitory computer-readable medium.

19 Claims, 11 Drawing Sheets

PHOTOVOLTAIC PANEL CLEANING SYSTEM

FIELD

The present disclosure relates to a photovoltaic (PV) panel cleaning system and more particularly to a modular system for cleaning one or more PV panels.

BACKGROUND AND SUMMARY

Photovoltaic solar panels use sunlight as a source of energy to generate electricity. Such panels are prone to soling because of ambient conditions and airborne foreign objects. For example, soiling may be caused by dust, ashes from wildfires, snow, leaves, rain, pollen and other objects or liquids that obstruct sunrays on the panels thereby significantly reducing electrical energy generated by the panels. Such reduction of energy generated can be detrimental to the economics of owning and operating solar panels. Periodic cleaning of the panels is required in order to reduce the energy production loss caused by soiling. Some cleaning approaches include employing robots that use liquids such as detergent or water to clean the panels. Other cleaning approaches include manually cleaning the panels. Exemplary conventional cleaning devices are disclosed in U.S. Patent Publication No. 2019/0353406 entitled "Device and Method for Automatically Dry Cleaning Reflective Panels" which published to Simonette on Nov. 21, 2019, and PCT Patent Publication No. WO2019/215756 entitled "Automated System for Cleaning of Solar Photovoltaic Panels in Solar Array and Method thereof" which published to Bagalkote on Nov. 14, 2019; both of which are incorporated by reference herein. These traditional approaches are energy intensive, inefficient, detrimental to the environment, and/or labor intensive.

In accordance with the present invention, a PV panel cleaning system is provided. In one aspect, the panel cleaning system includes a storage tank containing pressurized air, first and second linear actuators, and a panel-cleaning device wherein the pressurized air contained in the storage tank operates the first and second actuators and the panel-cleaning device to clean PV panels. In another aspect, the panel cleaning system includes a storage tank, first and second linear actuators, and a panel-cleaning device wherein the panel-cleaning device includes one or more nozzles and a wiper blade to clean PV panels. A further aspect includes sensors associated with the first and second actuators and panel-cleaning device and configured to scan and detect fluid and debris on the PV panels to be removed. Another aspect provides sensors associated with a panel cleaning system and a programmable controller or processor configured to execute instructions stored in a nontransitory computer-readable medium. A method of using a panel cleaning system is also provided.

The panel cleaning system according to the present disclosure is advantageous over conventional panel cleaning systems. For example, the panel cleaning system includes no rotating parts and consumes no net energy. That is, cleaning PV panels using the panel cleaning system allows the PV panels to generate additional electrical energy. A portion of the additional electrical energy generated by the PV panels is used to operate system. In this way, there is a net energy gain when using the panel cleaning system to clean the PV panels. Another benefit of the panel cleaning system is that it is a low maintenance system without the need of human involvement for operations. The panel cleaning system is advantageously modular so that it can be used for a single PV panel or arrays of multiple PV panels. The present system advantageously does not use liquids such as water (which can undesirably freeze and break components) to clean the PV panels thereby not voiding roof or panel warranties.

Additional advantages and features of the present invention can be ascertained from the following description and claims taken in conjunction with the appended drawings.

DRAWINGS

The drawings described herein are for illustrative purposes only of selected embodiments and not all possible implementations, and are not intended to limit the scope of the present disclosure.

Figure 1:
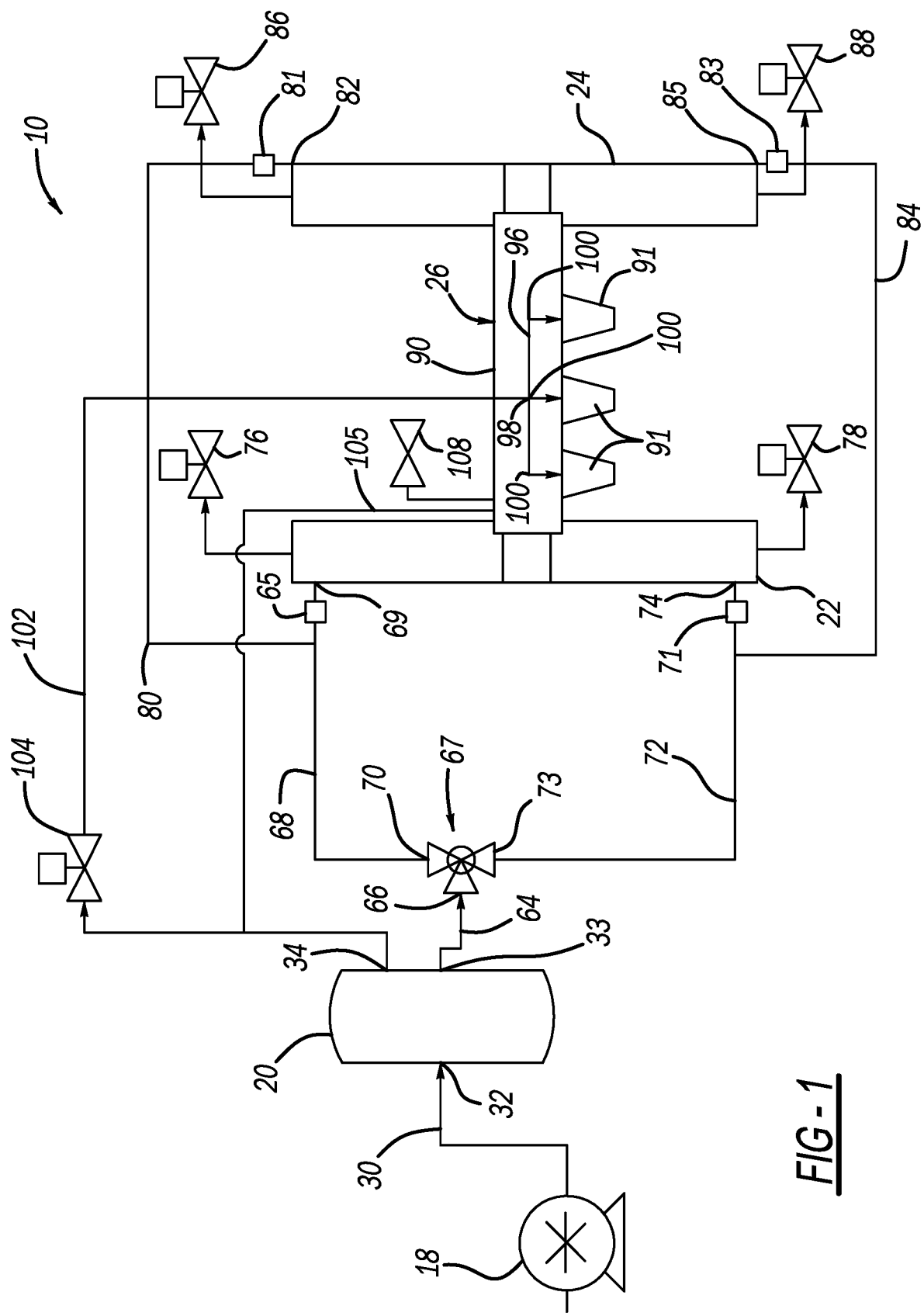
FIG. 1 is a schematic representation of a panel cleaning system according to the principles of the present disclosure.
Figure 6:
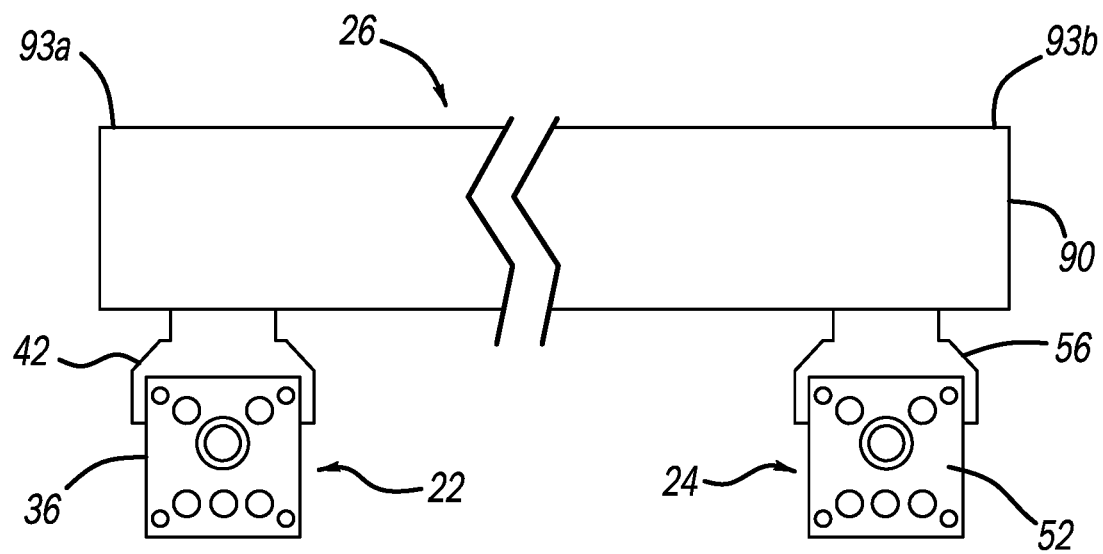
Figure 8A:
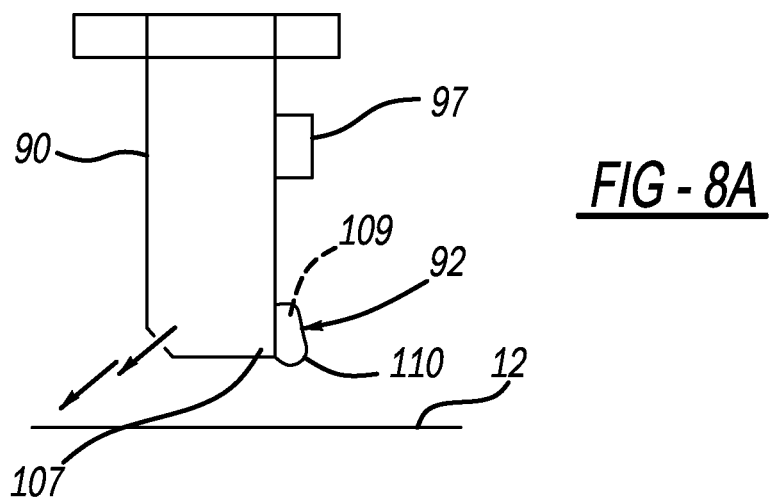
Figure 8B:
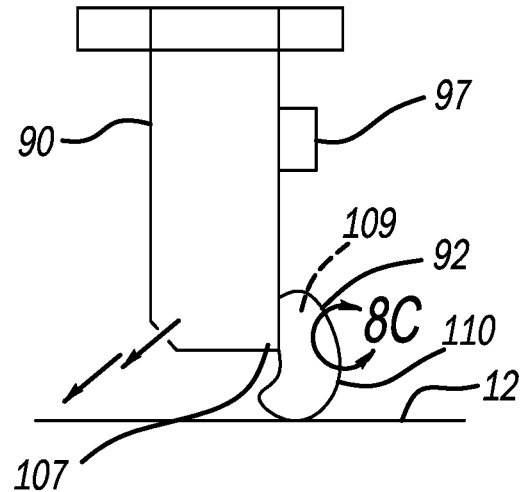
Figure 8C:
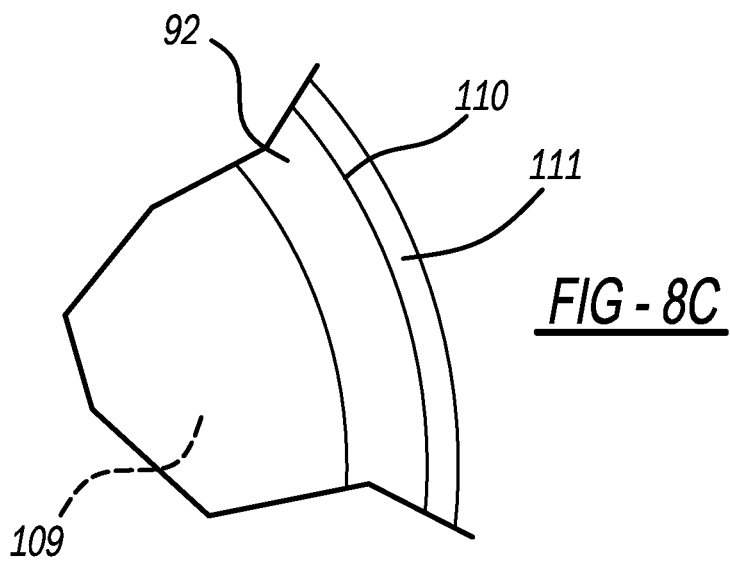
Figure 9:
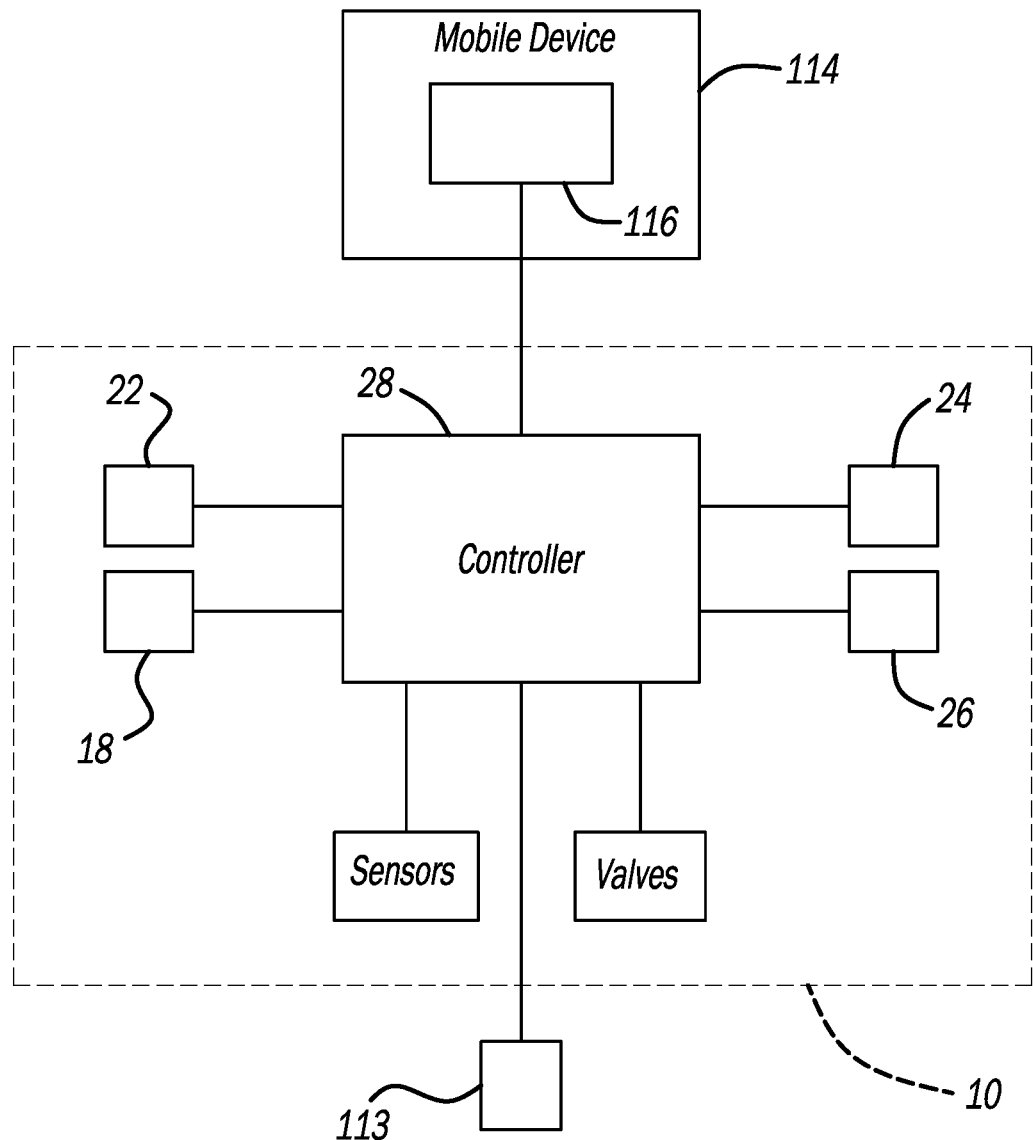
Figure 10:
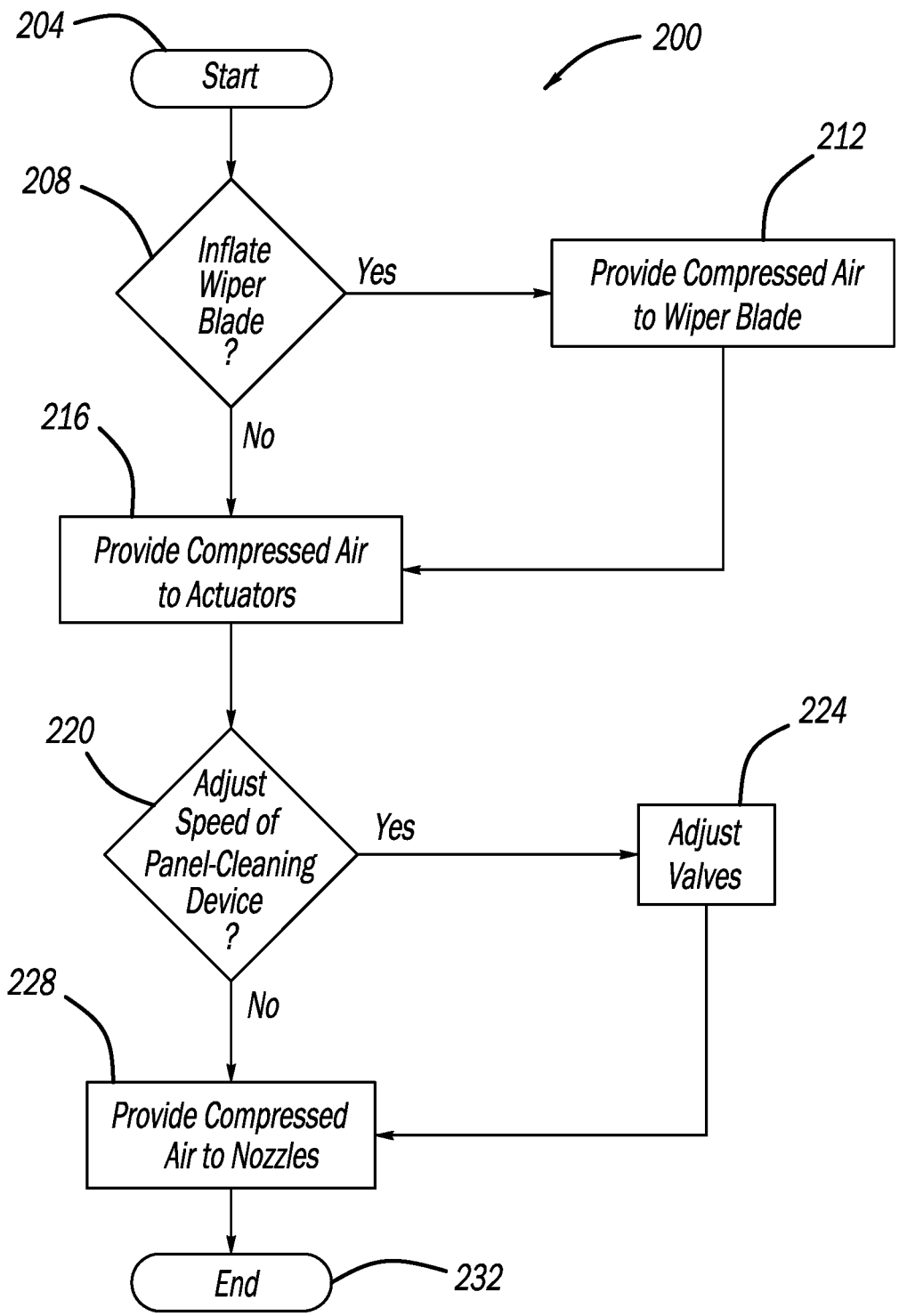
Figure 11:
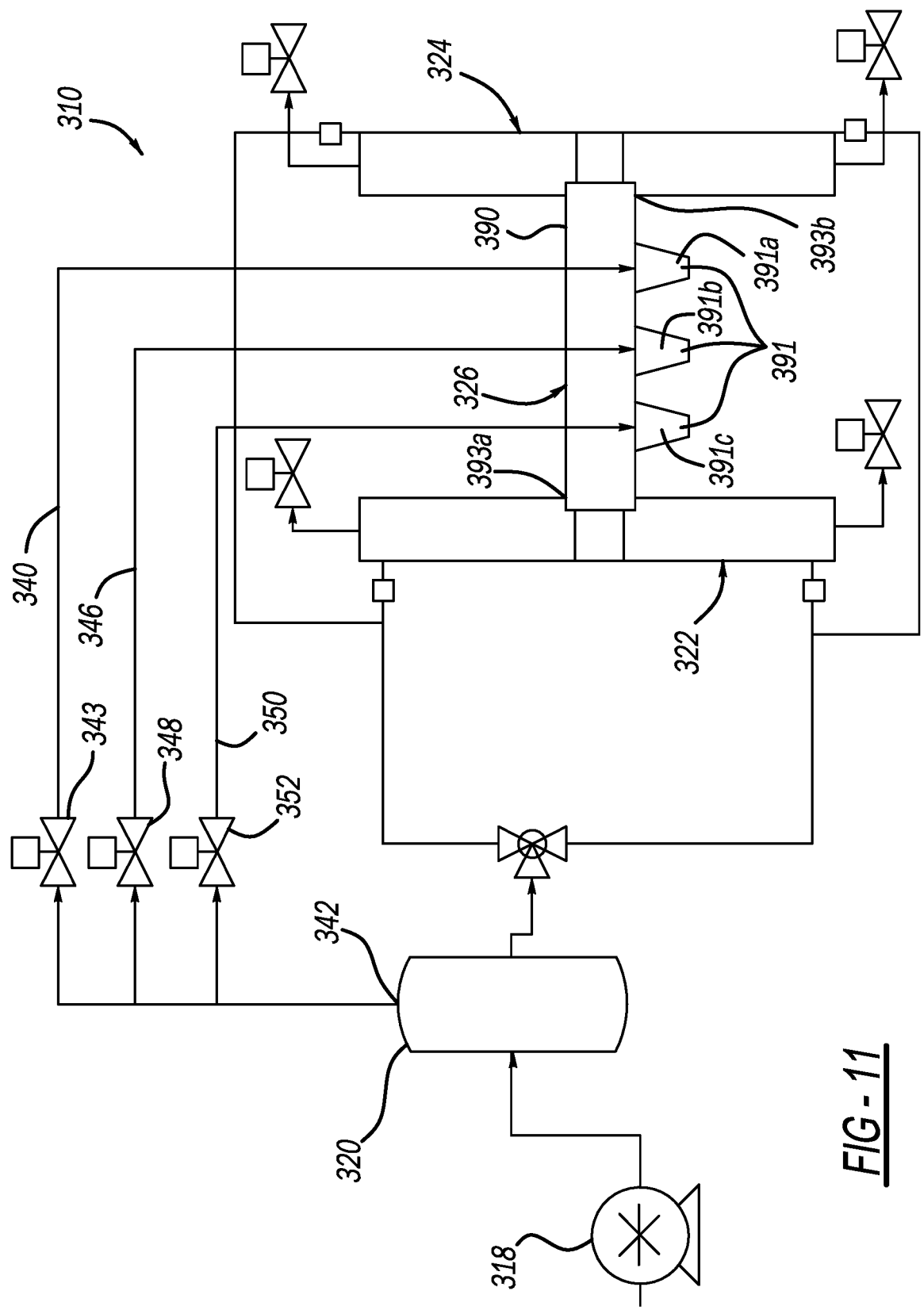
Figure 12:
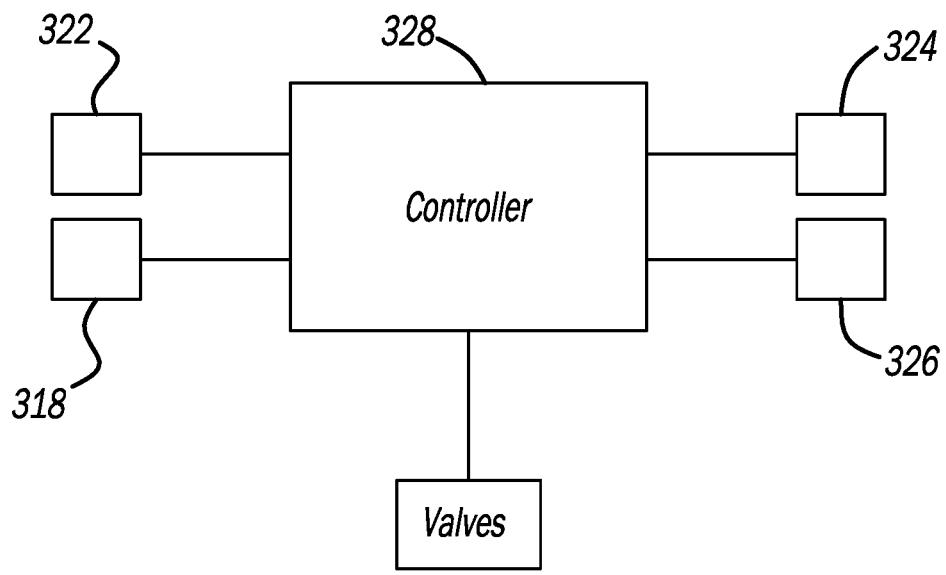
Figure 13:
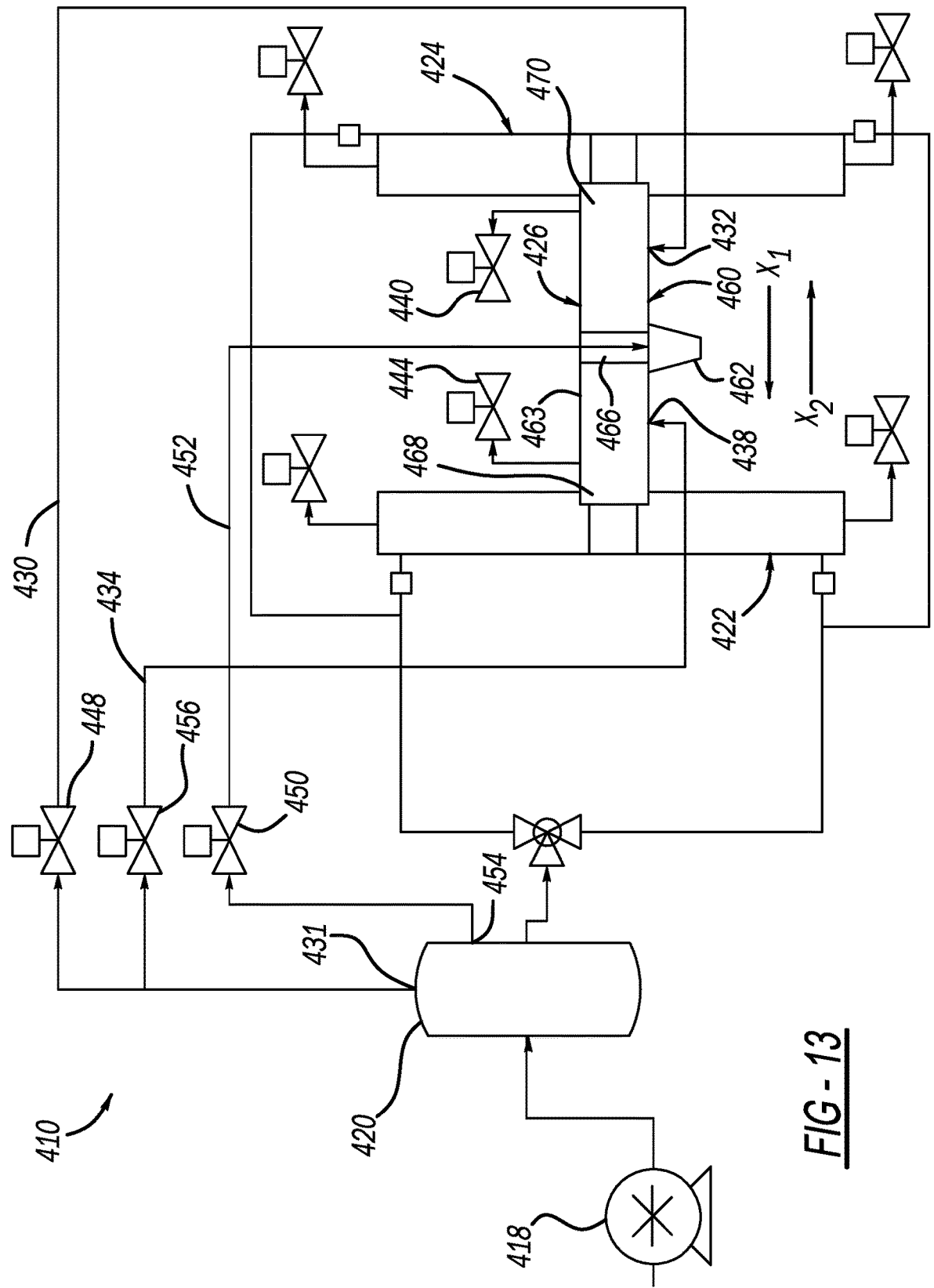
Figure 14:
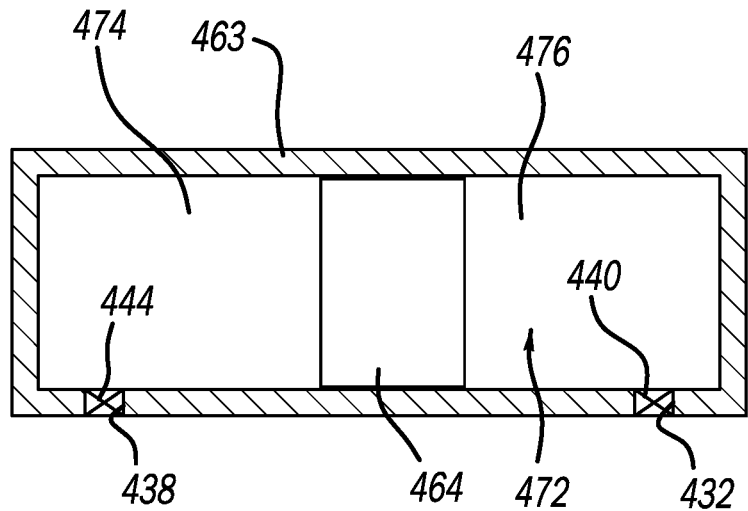
Figure 15:
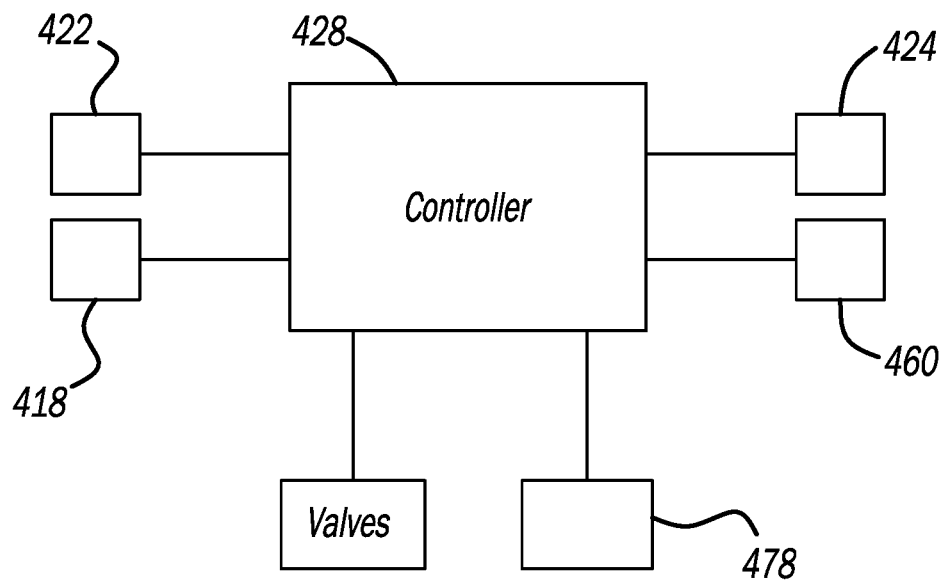

FIG. 5$a$ is a schematic representation of the first actuator;

FIG. 5$b$ is a schematic representation of the second actuator;

FIG. 6 is a back view of the first and second actuators and the panel-cleaning system;

FIG. 7$a$ is a front view of the panel-cleaning device;

FIG. 7$b$ is a back view of the panel-cleaning device;

FIG. 8$a$ is a side view of the panel-cleaning system with a wiper blade deflated;

FIG. 8$b$ is a side view of the panel-cleaning system with the wiper blade inflated;

FIG. 8$c$ is an enlarged view of the wiper blade indicated as area 8$c$ in FIG. 8$b$;

FIG. 9 is a functional block diagram showing components of an exemplary panel cleaning system shown in FIG. 1;

FIG. 10 is a flowchart showing control logic employed in the panel cleaning system;

FIG. 11 is a schematic representation of another panel cleaning system;

FIG. 12 is a functional block diagram showing components of an exemplary panel cleaning system shown in FIG. 11;

FIG. 13 is a schematic representation of another panel cleaning system;

FIG. 14 is a schematic representation of an actuator of a panel-cleaning device of the panel cleaning system of FIG. 13; and FIG. 15 is a functional block diagram showing components of an exemplary panel cleaning system shown in FIG. 13.

Corresponding reference numerals indicate corresponding parts throughout the several views of the drawings.

DETAILED DESCRIPTION

Example embodiments will now be described more fully with reference to the accompanying drawings.

Figure 2:
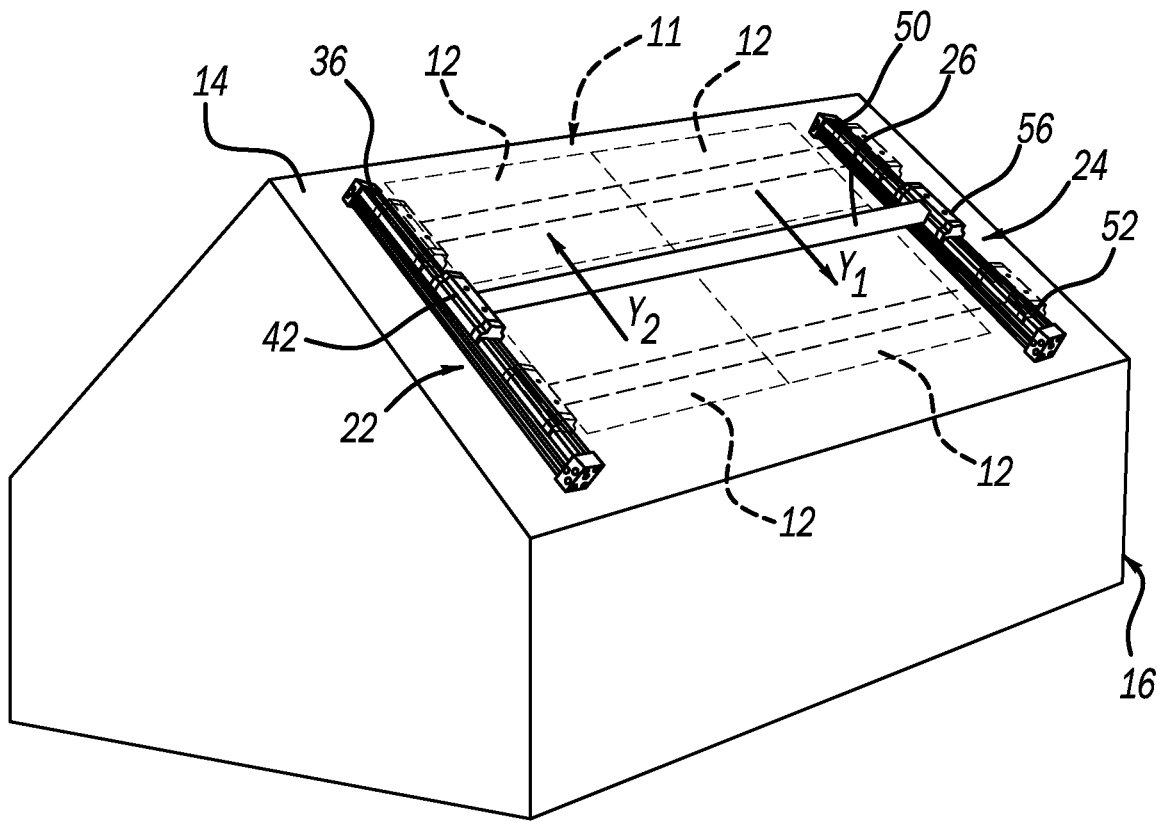
FIG. 2 is a perspective view of first and second actuators and a panel-cleaning device of the panel cleaning system shown in FIG. 1 located on a roof of a building.

With reference to FIGS. 1, 2 and 9, a photovoltaic (PV) panel cleaning system 10 is provided for cleaning a solar panel array 11 (FIG. 2) located on a roof 14 of a building 16. Solar panel array 11 includes PV panels 12. Cleaning system 10 includes a compressor 18, a storage tank 20, a first actuator 22, a second actuator 24, a panel-cleaning device or panel-cleaner 26, and a programmable controller or processor 28 configured to execute instructions stored in a non-transitory computer-readable medium (FIG. 9). Cleaning PV panels 12 using system 10 allows PV panels 12 to generate additional electrical energy. A portion of the additional electrical energy generated by panels 12 is used to operate system 10. In this way, there is a net energy gain when using system 10 to clean panels 12.

As shown in FIG. 1, the compressed air from compressor 18 is discharged to storage tank 20 (via passageway 30) where it is stored for use. Compressor 18 may be an electric compressor, for example. Compressor 18 and storage tank 20 are located remotely from roof 14 of building 16. That is, compressor 18 and storage tank 20 may be housed within a shed or other housing structure, for example, located remotely from roof 14 of building 16. Storage tank 20 includes an inlet 32, a first outlet 33, and a second outlet 34. Inlet 32 is in fluid communication with compressor 18 via passageway 30 so that compressed air discharged from compressor 18 flows to inlet 32 of storage tank 20.

First actuator 22 may be located on roof 14 at a first side of panel array 11 and may be a rodless pneumatic linear actuator. With reference to FIGS. 1-3, 5a, and 6, first actuator 22 includes a housing 36, a piston or drive member 40 (FIG. 5a), and a carriage 42. Piston 40 is movably disposed within a cavity 44 of housing 36 and separates cavity 44 into a first region 46 and a second region 48. Carriage 42 is mechanically connected to piston 40 through a slot 50 formed in housing 36 so that carriage 42 and piston 40 move relative to housing 36. Slot 50 extends substantially a length of housing 36. In some configurations, carriage 42 may be magnetically connected to piston 40 disposed within housing 36 so that carriage 42 and piston 40 move relative to housing 36.

Figure 3:
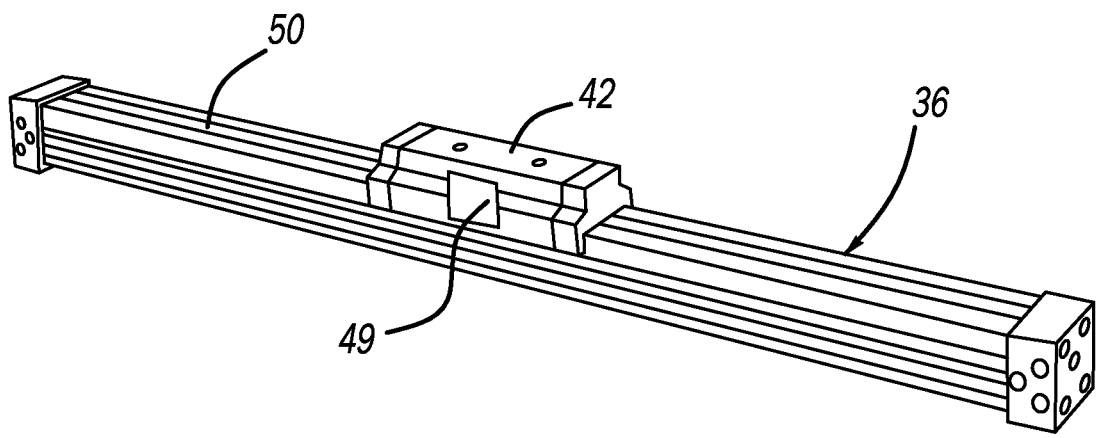
FIG. 3 is a perspective view of the first actuator shown in FIG. 2.

As shown in FIG. 3, one or more sensors 49 are coupled to carriage 42 and are configured to continuously or intermittingly scan PV panels 12 to detect fluid or debris located on PV panels 12 as carriage 42 moves along PV panels 12. Sensors 49 may be optical sensors, for example, and may be passive or active optical sensors. This data is communicated to controller 28 and used at least in part to determine the cleaning cycle of system 10. Stated differently, movement of piston 40 (and carriage 42) may be based at least in part on the data provided by sensors 49. For example, sensors 49 are able to scan and detect the debris size and type located on PV panels 12. In this way, piston 40 is operated to slow down or stop at a particular location so that compressed air discharged from panel-cleaning device 26 is directed at the debris until it is removed from PV panels 12.

Second actuator 24 is located on roof 14 at a second side of panel array 11 and may be a rodless pneumatic linear actuator. With reference to FIGS. 1, 2, 4, 5b, and 6, second actuator 24 includes a housing 52, a piston or drive member 54 (FIG. 5b), and a carriage 56. Piston 54 is movably disposed within a cavity 58 of housing 52 and separates cavity 58 into a first region 60 and a second region 62. Carriage 56 is mechanically connected to piston 54 through a slot 63 formed in housing 52 so that carriage 56 and piston 54 move relative to housing 52. Slot 63 extends substantially a length of housing 52. In some configurations, carriage 56 may be magnetically connected to piston 54 disposed within housing 52 so that carriage 56 and piston 54 move relative to housing 52.

Figure 4:
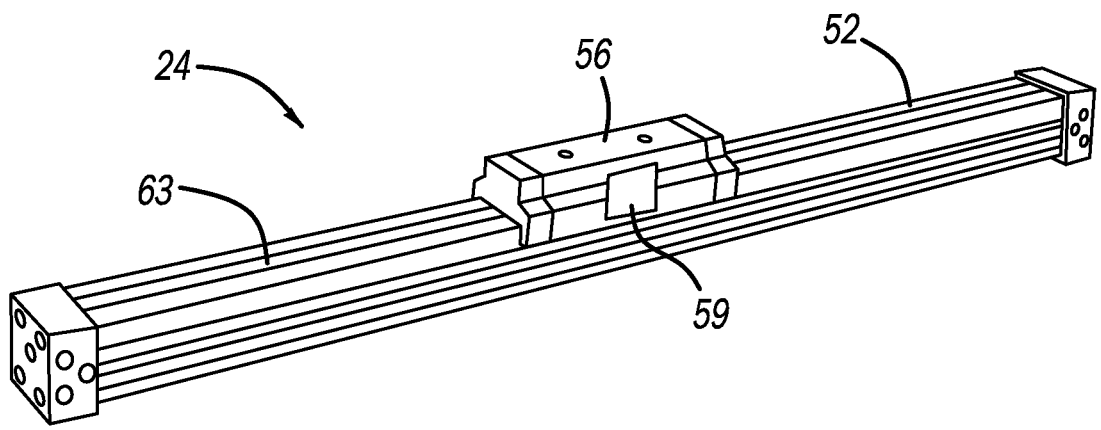
FIG. 4 is a perspective view of the second actuator shown in FIG. 2.

As shown in FIG. 4, one or more sensors 59 are coupled to carriage 56 and are configured to continuously or intermittingly scan PV panels 12 to detect fluid or debris located on PV panels 12 as carriage 56 moves along PV panels 12. Sensors 59 may be optical sensors, for example, and may be passive or active optical sensors. This data is communicated to controller 28 and used at least in part to determine the cleaning cycle of system 10. Stated differently, movement of piston 54 (and carriage 56) may be based at least in part on the data provided by sensors 59. For example, sensors 59 are able to scan and detect the debris size and type located on PV panels 12. In this way, piston 54 is operated to slow down or stop at a particular location so that compressed air discharged from panel-cleaning device 26 is directed at the debris until it is removed from PV panels 12.

As shown in FIG. 1, a first fluid passageway 64 extends from first outlet 33 of storage tank 20 to an inlet 66 of a 3-way valve 67. A second fluid passageway 68 extends from a first outlet 70 of 3-way valve 67 to a first inlet 69 of housing 36 of first actuator 22. A first sensor 65 is disposed along second fluid passageway 68 upstream of first inlet 69 of the housing 36 and is configured to measure an operating parameter indicative of a pressure of the compressed air flowing through second fluid passageway 68. This data is communicated to controller 28 and used at least in part to determine the cleaning cycle of system 10. First sensor 65 may be a pressure sensor such as a pressure gauge or pressure transducer, for example. A third fluid passageway 72 extends from a second outlet 73 of 3-way valve 67 to a second inlet 74 of housing 36 of first actuator 22. A second sensor 71 is disposed along third fluid passageway 72 upstream of second inlet 74 of the housing 36 and is configured to measure an operating parameter indicative of a pressure of the compressed air flowing through third fluid passageway 72. This data is communicated to controller 28 and used at least in part to determine the cleaning cycle of system 10. Second sensor 71 may be a pressure sensor such as a pressure gauge or pressure transducer, for example.

Figure 5A:
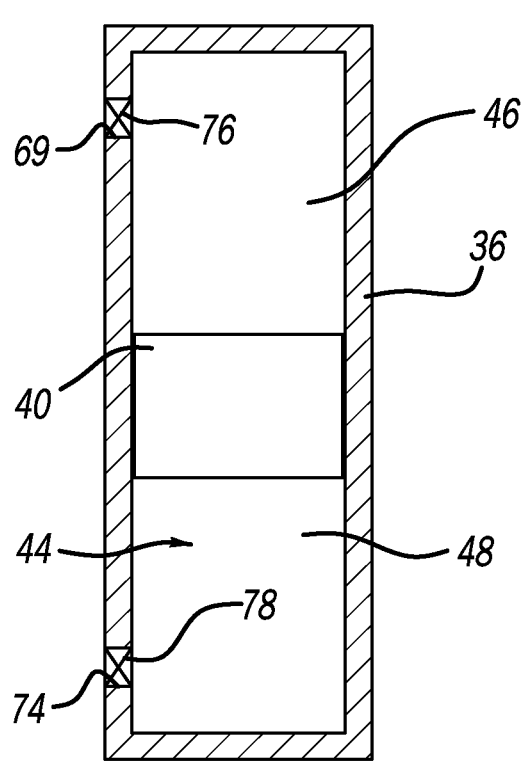

As shown in FIG. 5a, a first valve 76 is associated with first inlet 69 of housing 36 and is movable between an open position in which compressed air flowing through second fluid passageway 68 is allowed to flow to first region 46 of housing 36, and a closed position in which compressed air flowing through second fluid passageway 68 is prevented from flowing to first region 46. First valve 76 may be disposed within first inlet 69. Similarly, a second valve 78 is associated with second inlet 74 of housing 36 and may be movable between an open position in which compressed air flowing through third fluid passageway 72 is allowed to flow to second region 48 of housing 36, and a closed position in which compressed air flowing through third fluid passageway 72 is prevented from flowing to second region 48. Second valve 78 may be disposed within second inlet 74. It will be appreciated that first and second valves 76, 78 could be electromagnetic, solenoid-activated valves, for example.

As shown in FIG. 1, a first fluid line 80 extends from second fluid passageway 68 at a location between 3-way valve 67 and first valve 76 to a first inlet 82 of housing 52 of second actuator 24. A third sensor 81 is disposed along first fluid line 80 upstream of first inlet 82 of the housing 52 and is configured to measure an operating parameter indicative of a pressure of the compressed air flowing through first fluid line 80. This data is communicated to controller 28 and used at least in part to determine the cleaning cycle of system 10. Third sensor 81 may be a pressure sensor such as a pressure gauge or pressure transducer, for example. A second fluid line 84 extends from third fluid passageway 72 at a location between 3-way valve 67 and second valve 78 to a second inlet 85 of housing 52. A fourth sensor 83 is disposed along second fluid line 84 upstream of second inlet 85 of housing 52 and is configured to measure an operating parameter indicative of a pressure of the compressed air flowing through second fluid line 84. This data is communicated to controller 28 and used at least in part to determine the cleaning cycle of system 10. Fourth sensor 83 may be a pressure sensor such as a pressure gauge or pressure transducer, for example.

Figure 5B:
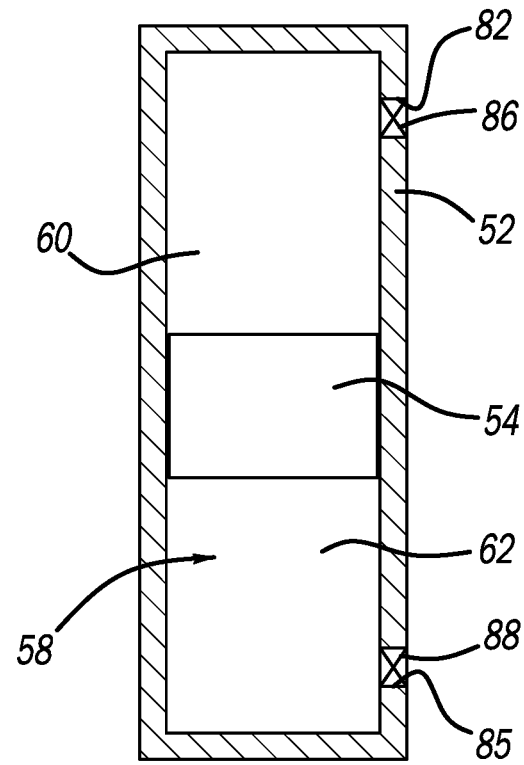

As shown in FIG. 5b, a third valve 86 is associated with first inlet 82 of housing 52 and is movable between an open position in which compressed air flowing through first fluid line 80 is allowed to flow to first region 60 of housing 52, and a closed position in which compressed air flowing through first fluid line 80 is prevented from flowing to first region 60. Third valve 86 may be disposed within first inlet 82. Similarly, a fourth valve 88 is associated with second inlet 85 of housing 52 and may be movable between an open position in which compressed air flowing through second fluid line 84 is allowed to flow to second region 62 of housing 52, and a closed position in which compressed air flowing through second fluid line 84 is prevented from flowing to second region 62. Fourth valve 88 may be disposed within second inlet 85. It will be appreciated that third and fourth valves 86, 88 could be solenoid valves, for example.

Figure 7A:
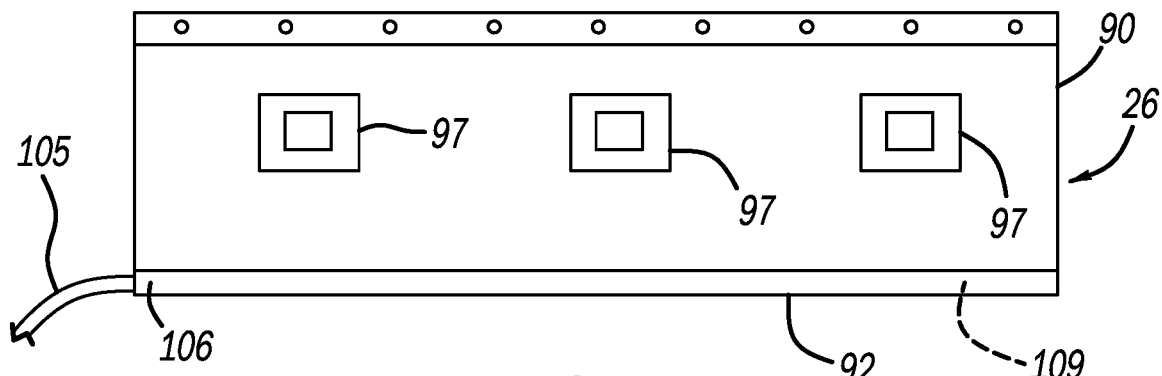

With reference to FIG. 1, 7, 8a, 8b, panel-cleaning device 26 includes a carriage 90, one or more nozzles or outlet slots 91 (FIG. 1), and an optional wiper blade 92 (FIGS. 7a, 8a, and 8b). Panel-cleaning device 26 may be an air knife which generates high intensity airflow to blow off liquid and debris from the PV panels 12. Carriage 90 has a first end 93a that is mechanically coupled to sliding carriage 42 of first actuator 22, which engages a C-shaped track of housing 36 and a second end 93b that is mechanically coupled to sliding carriage 56 of second actuator 24, which engages a C-shaped track of housing 52. That is, first end 93a is positioned on and supported by a top surface of carriage 42 and is coupled to carriage 42 via fasteners (e.g., screws, bolts, and/or rivets) extending through a lower surface of first end 93a and the top surface of carriage 42. Similarly, second end 93b is positioned on and supported by a top surface of carriage 56 and is coupled to carriage 56 via fasteners (e.g., screws, bolts, and/or rivets) extending through a lower surface of second end 93b and the top surface of carriage 56 (FIG. 6). In this way, movement of pistons 40, 54 of actuators 22, 24, respectively, also moves carriage 90 along panel array 11. In some configurations, first end 93a is magnetically coupled to carriage 42 and second end 93b is magnetically coupled to carriage 56. That is, a first magnet is coupled to the lower surface of first end 93a and a second magnet is coupled to the top surface of carriage 42. In this way, the first magnet produces a magnetic force urging the second magnet towards it thereby coupling first end 93a and carriage 42 to each other. Similarly, a third magnet is coupled to the lower surface of second end 93b and a fourth magnet is coupled to the top surface of carriage 56. In this way, the third magnet produces a magnetic force urging the fourth magnet towards it thereby coupling second end 93b and carriage 56 to each other. Alternatively, a first magnet can be located at the top surface of carriage 42 and magnetic material at the bottom surface of the end 93a, and a second magnet can be located at the top surface of carriage 56 and magnetic material at the lower surface of the end 93b.

One or more sensors 97 are coupled to carriage 90 and are configured to continuously or intermittingly scan PV panels 12 to detect fluid or debris located on PV panels 12 as carriage 90 moves along PV panels 12. Sensors 97 may be optical sensors, for example, disposed along a length of carriage 90, and may be passive or active optical sensors. This data is communicated to controller 28 and used at least in part to determine the cleaning cycle of system 10. Stated differently, movement of pistons 40, 54 may be based at least in part on the data provided by sensors 97. For example, sensors 97 are able to scan and detect the debris size and type located on PV panels 12. In this way, pistons 40, 54 are operated to slow down or stop at a particular location, so that compressed air discharged from nozzles 91 is directed at the debris until it is removed from PV panels 12.

As shown in FIG. 1, a manifold 96 is associated with the carriage 90 and includes an inlet 98 and a plurality of outlets 100. That is, manifold 96 can be disposed within carriage 90, for example. A fluid passageway 102 extends from second outlet 34 of storage tank 20 to inlet 98 of manifold 96. A valve 104 is disposed along fluid passageway 102 and is movable between an open position in which compressed air flowing through fluid passageway 102 is allowed to flow to manifold 96, and a closed position in which compressed air flowing through fluid passageway 102 is prevented from flowing to manifold 96.

Figure 7B:
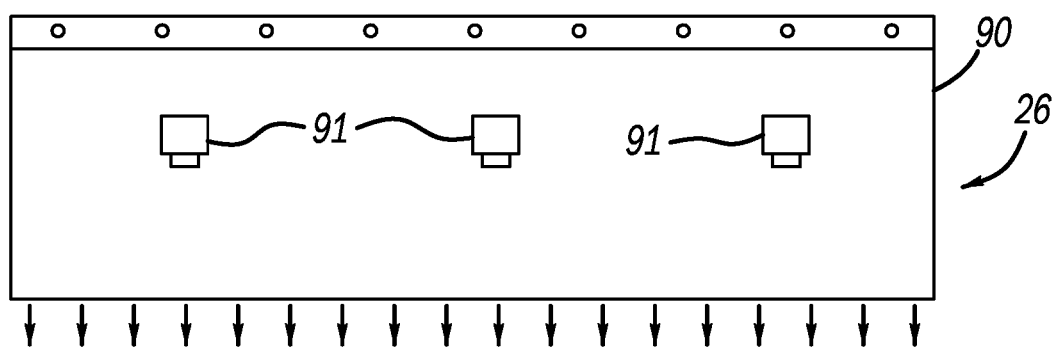

Each nozzle 91 is in fluid communication with a respective outlet 100 of manifold 96. Each nozzle 91 is also configured to entrain surrounding compressed air and direct the compressed air to the panel array 11 to clean the PV panels 12. Each nozzle 91 is designed and positioned such that nozzles 91 clean fluid or debris such as dirt, pollen, or dust, for example, located on panels 12 without touching panels 12. That is, each nozzle 91 is spaced apart from panels 12 approximately 1-5 millimeters (mm). As shown in FIG. 7b, nozzles 91 generate a uniform sheet of laminar airflow to blow off liquid and debris from the PV panels 12. The uniform sheet of laminar airflow discharged from nozzles 91 attaches to a surface of the PV panels 12 using the Coandă effect.

The pressure of compressed air discharged from each nozzle 91 is lower than the pressure of compressed air stored in storage tank 20. The pressure and flow rate of compressed air discharged from each nozzle 91 are controlled so that maximum cleaning efficiency of the panels 12 is achieved for a particular location. That is, the pressure and flow rate of compressed air discharged from each nozzle 91 are controlled based in part on the debris size and type and ambient conditions (e.g., ambient temperature and humidity). In some configurations, a heating element may be located along fluid passageway 102 to heat compressed air flowing therethrough. In this way, the compressed air discharged from each nozzle 91 is able to melt ice or snow that has accumulated on panels 12.

A fluid line 105 extends from fluid passageway 102 to an inlet 106 of wiper blade 92. In some configurations, fluid line 105 extends from storage tank 20 to wiper blade 92. A valve 108 is associated with inlet 106 of wiper blade 92 and is movable between an open position in which compressed air flowing through fluid line 105 is allowed to flow to wiper blade 92, and a closed position in which compressed air flowing through fluid line 105 is prevented from flowing to wiper blade 92. Valve 108 can be disposed within inlet 106, for example.

With reference to FIGS. 7a, 7b, 8a, and 8b, wiper blade 92 is removably coupled to and supported by a leading edge 107 of carriage 90 and extends substantially a length of carriage 90. In some configurations, wiper blade 92 can be removably coupled to carriage 90 via fasteners. In other configurations, wiper blade 92 can be removably coupled to carriage 90 via adhesive attachment means. Wiper blade 92 is also made of an inflatable material. In some configurations, wiper blade 92 is made of polyvinyl chloride (PVC), urethane, textile reinforced urethane plastic, rubber, thermoplastic or polyurethane, for example. Wiper blade 92 is operable between a first state (inflated state) in which compressed air flows to a cavity 109 of wiper blade 92 to inflate wiper blade 92, and a second state (deflated state) in which compressed air is purged from wiper blade 92. When wiper blade 92 is in the first state, an outer surface 110 of wiper blade 92 contacts PV panels 12. In this way, wiper blade 92 is able to remove debris located on the PV panels 12 as carriage 90 moves along PV panels 12. When wiper blade 92 is in the second state, valve 108 purges compressed air within cavity 109 to ambient surroundings thereby causing wiper blade 92 to deflate and become spaced apart from PV panels 12

Outer surface 110 of hollow wiper blade 92 is coated with micro fabrics 111 to provide for a soft and flexible contact between wiper blade 92 and PV panels 12. In some configurations, only a portion of hollow wiper blade 92 that comes in contact with PV panels 12 is coated with micro fabrics 111. Micro fabrics 111 can be made of compositions of polyester and polyamide. For example, micro fabrics 111 can be 80% polyester and 20% polyamide, 50% polyester and 50% polyamide, or 90% polyester and 10% polyamide. Micro fabrics 111 have a thickness in the range of 1-20 mm, more preferably 2-5 mm, deposited on outer surface 110 of wiper blade 92. Micro fabrics 111 are glued (laminated with glue and heat) on wiper blade 92. Optionally, micro fabrics 111 can be attached with clips or other fastening mechanisms on wiper blade 92.

As shown in FIG. 9, controller 28 is in communication with compressor 18, actuators 22, 24, panel-cleaning device 26, valves 67, 76, 78, 86, 88, 104, 108, sensors 49, 59, 65, 71, 81, 83, 97, and an inverter 113. Controller 28 can control operation of compressor 18, actuators 22, 24 and device 26, and can open and close valves 67, 76, 78, 86, 88, 104, 108.

A mobile device 114 (e.g., a tablet, a smartphone, a laptop, or other similar device) includes a processor that is configured to execute instructions stored in a nontransitory computer-readable medium, such as a read-only memory (ROM) and/or random-access memory (RAM). Mobile device 114 includes a software application 116. The functions of the software application 116 is accessed using, for example, native application editions of the software and/or web applications of the software. Mobile device 114 and controller 28 are configured to, using the software application 116, communicate via wireless communication protocol, which includes an internet, Wi-Fi, Bluetooth®, or cellular connection or any other wireless communication protocol, for example. In this way, a user may control operations of system 10 using mobile device 114.

With reference to FIG. 10, a flowchart illustrating exemplary software control logic 200 is shown. Control logic 200 begins at 204 when the system 10 is activated. The system 10 may be activated, for example, in response to 1) inverter 113 indicating a predetermined threshold decrease in electricity generation, 2) an operator sending a cleaning command to controller 28 via mobile device 114, 3) one or more sensors 49, 59, 65, 71, 81, 83, 97 detecting fluid or debris on panel array 11, or 4) a preset schedule to clean panel array 11.

At 208, control logic 200 determines, using controller 28, whether wiper blade 92 needs to be inflated. For example, wiper blade 92 may need to be inflated to remove certain fluid or debris detected by sensors 49, 59, 97. In another example, the operator may select an option to inflate wiper blade 92 when sending the cleaning command to controller 28 via mobile device 114. If so, control logic 200 proceeds to 212; otherwise, control logic 200 proceeds to 216. At 212, control logic 200 provides, using controller 28, compressed air from storage tank 20 to wiper blade 92. That is, controller 28 moves valve 108 from the closed position to the open position. In this way, compressed air from storage tank 20 flows to wiper blade 92 so that wiper blade 92 is inflated.

At 216, control logic 200 provides, using controller 28, compressed air from storage tank 20 to actuators 22, 24. For example, to clean an upper portion of panel array 11, valves 67, 78, 88 are each moved from the closed position to the open position and valves 76, 86 are each moved from the open position to the closed position, so that compressed air from storage tank 20 flows to regions 48, 62 of actuators 22, 24, respectively, thereby exerting a force on pistons 40, 54 to cause pistons 40, 54 and panel-cleaning device 26 to move in a second direction Y2 along panel array 11. Compressed air contained in regions 46, 60 of actuators 22, 24 are purged to ambient surroundings. It is understood that valves 67, 76, 78, 86, 88 may be moved simultaneously or in a sequence (e.g., moving valves 76, 86 to the closed position, then moving valve 67 to the open position, and finally moving valves 78, 88 to the open position).

To clean a lower portion of panel array 11, valves 67, 76, 86 are each moved from the closed position to the open position and valves 78, 88 are each moved from the open position to the closed position, so that compressed air from storage tank 20 flows to regions 46, 60 of actuators 22, 24, respectively, thereby exerting a force on pistons 40, 54 to cause pistons 40, 54 and panel-cleaning device 26 to move in a first direction Y1 along panel array 11. Compressed air contained in regions 48, 62 of actuators 22, 24 are purged to ambient surroundings. It is understood that valves 67, 76, 78, 86, 88 may be moved simultaneously or in a sequence (e.g., moving valves 78, 88 to the closed position, then moving valve 67 to the open position, and finally moving valves 76, 86 to the open position).

At 220, control logic 200 determines, using controller 28, whether the speed of panel-cleaning device 26 needs to be adjusted. For example, data obtained via one or more sensors 49, 59, 65, 71, 81, 83, 97 is communicated to controller 28 so that controller 28 can increase or decrease speed of panel-cleaning device 26. That is, if sensors 49, 59, 97 detect heavy debris on panels 12 then the speed of panel-cleaning device 26 may be decreased. If sensors 49, 59, 97 detect little or no debris on panels 12 then the speed of panel-cleaning device 26 may be increased. If so, control logic 200 proceeds to 224; otherwise, control logic 200 proceeds to 228.

At 224, control logic 200 adjust, using controller 28, the position of valves 78, 88 to increase or decrease the speed of panel-cleaning device 26 in a second direction Y2 along panel array 11, or the position of valves 76, 86 to increase or decrease the speed of panel-cleaning device 26 in a first direction Y1 along panel array 11. At 228, control logic 200 provides, using controller 28, compressed air from storage tank 20 to nozzles 91. That is, controller 28 moves valve 104 from the closed position to the open position, so that compressed air from the storage tank 20 flows to nozzles 91 where it is directed to the PV panels 12 to clean the PV panels 12. The control logic 200 then proceeds to 236 and ends. The system 10 ends when, for example, a stop command is generated from controller 28. The stop command may be generated based on data from sensors 49, 59, 65, 71, 81, 83, 97, or based on the ending of the predetermined cleaning cycle. In some configurations, the stop command may be generated based on a system fault detection being activated, or an operator manually stopping the cleaning cycle.

System 10 of the present disclosure provides the benefit of cleaning PV panels 12 without using rotating parts or liquids such as water. Another benefit of panel cleaning system 10 is that it is a low maintenance system without the need of human involvement for operations.

With reference to FIGS. 11 and 12, another system 310 is provided. The structure and function of system 310 may be similar or identical to system 10 described above, apart from any exception noted below.

As shown in FIG. 11, system 310 includes a compressor 318, a storage tank 320, a first actuator 322, a second actuator 324, a panel-cleaning device 326, and a programmable controller or processor 328 (FIG. 12) configured to execute instructions stored in a nontransitory computer-readable medium. The structure and function of compressor 318, storage tank 320, first actuator 322, second actuator 324, and panel-cleaning device 326 may be similar or identical to that of compressor 18, storage tank 20, first actuator 22, second actuator 24, and panel-cleaning device 26 respectively, described above, and therefore, will not be described again in detail.

Panel-cleaning device 326 includes a carriage 390 and a plurality of nozzles or slots 391. Carriage 390 has a first end 393a that is mechanically coupled to first actuator 322 and a second end 393b that is mechanically coupled to second actuator 324. In this way, movement of pistons of actuators 322, 324, also moves carriage 390 along panel array.

Each nozzle 391 is coupled to and supported by carriage 390. Each nozzle 391 is designed and positioned such that nozzles 391 clean fluid or debris such as dirt, pollen, or dust, for example, located on the panel array without touching the panel array. That is, each nozzle 391 is spaced apart from the panel array.

A first fluid passageway 340 extends from an outlet 342 of storage tank 320 to a first nozzle 391a of nozzles 391. A first valve 343 is disposed along first fluid passageway 340 and is movable between an open position in which compressed air flowing through first fluid passageway 340 is allowed to flow to first nozzle 391a, and a closed position in which compressed air flowing through first fluid passageway 340 is prevented from flowing to first nozzle 391a. A second fluid passageway 346 extends from first fluid passageway 340 at a location between outlet 342 and first valve 343 to a second nozzle 391b of nozzles 391. A second valve 348 is disposed along second fluid passageway 346 and is movable between an open position in which compressed air flowing through second fluid passageway 346 is allowed to flow to second nozzle 391b, and a closed position in which compressed air flowing through second fluid passageway 346 is prevented from flowing to second nozzle 391b.

A third fluid passageway 350 extends from first fluid passageway 340 at a location between outlet 342 and first valve 343 to a third nozzle 391c of nozzles 391. A third valve 352 is disposed along third fluid passageway 350 and is movable between an open position in which compressed air flowing through third fluid passageway 350 is allowed to flow to third nozzle 391c, and a closed position in which compressed air flowing through third fluid passageway 350 is prevented from flowing to third nozzle 391c. As shown in FIG. 12, controller 328 is in communication with compressor 318, actuators 322, 324, panel-cleaning device 326, and valves 348, 343, 352. Controller 328 can control operation of compressor 318, actuators 322, 324 and device 326, and can open and close valves 348, 343, 352.

System 310 provides the benefit of allowing the compressed air directed from one of nozzles 391a, 391b, 391c to be controlled independently of the other nozzles 391a, 391b, 391c. In this way, compressed air is allowed to be focused on a smaller area of panel array that needs cleaning.

With reference to FIGS. 13-15, another system 410 is provided. The structure and function of system 410 may be similar or identical to systems 10, 310 described above, apart from any exception noted below.

As shown in FIG. 13, system 410 includes a compressor 418, a storage tank 420, a first actuator 422, a second actuator 424, a panel-cleaning device 426, and a programmable controller or processor 428 configured to execute instructions stored in a nontransitory computer-readable medium (FIG. 15). The structure and function of compressor 418, storage tank 420, first actuator 422, and second actuator 424, may be similar or identical to that of compressor 18, storage tank 20, first actuator 22, and second actuator 24, respectively, described above, and therefore, will not be described again in detail.

Panel-cleaning device 426 includes an actuator 460 and a nozzle 462. With reference to FIGS. 13 and 14, actuator 460 is a rodless pneumatic linear actuator and includes a housing 463, a piston 464 (FIG. 14), and a carriage 466 (FIG. 13). Housing 463 includes a first end 468 mechanically coupled to a carriage of first linear actuator 422 and a second end 470 mechanically coupled to a carriage of second linear actuator 424. In some configurations, first end 468 may be magnetically coupled to the carriage of first linear actuator 422 and second end 470 may be magnetically coupled to the carriage of second linear actuator 424. Piston 464 is movably disposed within a cavity 472 of housing 463 and separates cavity 472 into a first region 474 and a second region 476. Carriage 466 is mechanically or magnetically connected to piston 464 so that carriage 466 and piston 464 move relative to housing 463.

One or more sensors 478 are associated with housing 463 and are configured to continuously or intermittingly scan a panel array to detect fluid or debris located on the panel array. Sensors 478 may be optical sensors, for example, and may be passive or active optical sensors. This data is communicated to controller 428 and used at least in part to determine the cleaning cycle of system 410. Stated differently, movement of piston 464 (and carriage 466) may be based at least in part on the data provided by sensors 478. For example, sensors 478 are able to scan and detect the debris size and type located on the panel array. In this way, piston 464 is operated to slow down or stop at a particular location so that compressed air discharged from nozzle 462 is directed at the debris until it is removed from the panel array.

A first fluid passageway 430 extends from a first outlet 431 of storage tank 420 to a first inlet 432 of housing 463 of actuator 460. A second fluid passageway 434 extends from first fluid passageway 430 to a second inlet 438 of housing 463 of actuator 460. A first valve 440 is associated with first inlet 432 of housing 463 and is movable between an open position in which compressed air flowing through first fluid passageway 430 is allowed to flow to region 476 of housing 463, and a closed position in which compressed air flowing through first fluid passageway 430 is prevented from flowing to region 476. First valve 440 may be disposed within first inlet 432. Similarly, a second valve 444 is associated with second inlet 438 of housing 463 and may be movable between an open position in which compressed air flowing through second fluid passageway 434 is allowed to flow to region 474 of housing 463, and a closed position in which compressed air flowing through second fluid passageway 434 is prevented from flowing to region 474. Second valve 444 may be disposed within second inlet 438.

A third valve 448 is disposed along first fluid passageway 430 and is movable between an open position in which compressed air is allowed to flow through first fluid passageway 430, and a closed position in which compressed air is prevented from flowing through first fluid passageway 430. A fourth valve 456 is disposed along second fluid passageway 434 and is movable between an open position in which compressed air is allowed to flow through second fluid passageway 434, and a closed position in which compressed air is prevented from flowing through second fluid passageway 434.

Nozzle 462 is coupled to and supported by carriage 466. Nozzle 462 is designed and positioned such that nozzle 462 cleans fluid or debris such as dirt, pollen, or dust, for example, located on the panel array without touching the panel array. That is, nozzle 462 is spaced apart from the panel array and directs compressed air to the panel array to clean the panel array. A third fluid passageway 452 extends from a second outlet 454 of storage tank 420 to nozzle 462. A fifth valve 450 is disposed along third fluid passageway 452 and is movable between an open position in which compressed air flowing through third fluid passageway 452 is allowed to flow to nozzle 462, and a closed position in which compressed air flowing through third fluid passageway 452 is prevented from flowing to nozzle 462.

Controller 428 is in communication with compressor 418, actuators 422, 424, 460, valves 440, 444, 448, 450, 456, and sensor 478. Controller 428 can control operation of compressor 418, actuators 422, 424, 460, and can open and close valves 440, 444, 448, 450, 456.

Valves 440, 448 are each moved from the closed position to the open position so that compressed air from storage tank 420 flows to region 476 of actuator 460 thereby exerting a force on piston 464 to cause piston 464 and carriage 466 to move in a first lateral direction X1 along the panel array. Compressed air contained in region 474 of actuator 460 is purged to ambient surroundings. Similarly, valves 444, 456 are each moved from the closed position to the open position so that compressed air from storage tank 420 flows to region 474 of actuator 460 thereby exerting a force on piston 464 to cause piston 464 and carriage 466 to move in a second lateral direction X2 along the panel array. Compressed air contained in region 476 of actuator 460 is purged to ambient surroundings.

System 410 provides the benefit of allowing nozzle 462 to move laterally along the panel array. In this way, compressed air is allowed to be focused on a smaller area of the panel array that needs cleaning.

While various embodiments have been disclosed, other variations are envisioned. For example, linear actuators 22, 24 may be single acting actuators as opposed to double acting actuators. Furthermore, actuator 22 may be replaced with a rail and sliding guide member and the sliding guide member may be attached to panel-cleaning device 26. In this way, the sliding guide member may slide along the rail when actuator 24 moves the panel-cleaning device 26 along panel array 11. It is also envisioned that the PV panels may be supported within frames which have posts mounted to the ground, or which are mounted on top of a vehicle parking roof or the like, or floating on water instead of the roof mounting illustrated, such that the present cleaning apparatus is mounted to such a frame or associated peripherally located structure. Furthermore, a blower can be used to run the nozzles for cleaning the PV panels instead of compressed air from the storage tank. Furthermore, features from one embodiment can be interchanged with features of another embodiment disclosed hereinabove, and the claims can be multiply dependent on each other in any combination. Variations are not to be regarded as a departure from the present disclosure, and all such modifications are intended to be included within the scope and spirit of the present invention.

The invention claimed is:

1. A system for cleaning photovoltaic panels, the system comprising:
   a storage tank containing pressurized air;
   a first linear actuator located at a first side of the photovoltaic panels and in fluid communication with the storage tank, the first linear actuator including a first housing and a first piston moveably disposed in the first housing;
   a second linear actuator located at a second side of the photovoltaic panels and in fluid communication with the storage tank, the second linear actuator including a second housing and a second piston moveably disposed in the second housing; and
   a panel-cleaner in fluid communication with the storage tank and coupled to the first piston and the second piston, the panel-cleaner directing pressurized air from the storage tank to the photovoltaic panels to clean the photovoltaic panels.

2. The system of claim 1, further comprising:
   a first carriage coupled to the first piston;
   a second carriage coupled to the second piston;
   a sensor associated with one of the first and second carriages and configured to detect objects or fluid located on the photovoltaic panels; and
   a controller configured to execute programmed instructions stored in a nontransitory computer-readable medium, wherein the instructions include:
   (i) obtaining data indicative of objects or fluid located on the photovoltaic panels from the sensor; and
   (ii) automatically operating the first and second linear actuators and the panel-cleaner in response to the sensor detecting objects or fluid on the photovoltaic panels.

3. The system of claim 2, further comprising a remote mobile transmitter in communication with the controller and configured to send a cleaning command to the controller to execute the instructions.

4. The system of claim 1, further comprising:
   a first carriage coupled to the first piston;
   a second carriage coupled to the second piston;
   a first sensor associated with the first carriage and configured to detect objects or fluid located on the photovoltaic panels;
   a second sensor associated with the second carriage and configured to detect objects or fluid located on the photovoltaic panels;
   a controller configured to execute programmed instructions stored in a nontransitory computer-readable medium, wherein the instructions include:
   (i) obtaining data indicative of objects or fluid located on the photovoltaic panels from the first and second sensors; and
   (ii) automatically operating the first and second linear actuators and the panel-cleaner in response to at least one of the first and second sensors detecting objects or fluid on the photovoltaic panels.

5. The system of claim 4, wherein the first and second sensors are optical sensors.

6. The system of claim 1, wherein the panel-cleaner includes an air knife.

7. The system of claim 1, further comprising:
a first fluid passageway in fluid communication with the storage tank and the first linear actuator, and providing pressurized air from the storage tank to the first linear actuator to move the first piston;
a second fluid passageway in fluid communication with the storage tank and the second linear actuator, and providing pressurized air from the storage tank to the second linear actuator to move the second piston; and
a third fluid passageway in fluid communication with the storage tank and the panel-cleaner, and providing pressurized air from the storage tank to the panel-cleaner to clean the photovoltaic panels.

8. The system of claim 7, wherein the panel-cleaner further includes a manifold in fluid communication with the third fluid passageway and a plurality of nozzles, and wherein the plurality of nozzles direct pressurized air flowing through the third fluid passageway and the manifold to the photovoltaic panels to clean the photovoltaic panels.

9. The system of claim 1, wherein the panel-cleaner includes:
a housing defining a cavity and having a first end coupled to the first piston and a second end coupled to the second piston;
a carriage movably coupled to the housing; and
a nozzle coupled to the carriage,
wherein the nozzle directs pressurized air from the storage tank to the photovoltaic panels to clean the photovoltaic panels.

10. The system of claim 9, further comprising:
a first fluid passageway in fluid communication with the storage tank and a first region of the cavity of the housing, the first fluid passageway providing pressurized air from the storage tank to the first region to move the carriage and the nozzle in a first lateral direction;
a second fluid passageway in fluid communication with the storage tank and a second region of the cavity of the housing, the second fluid passageway providing pressurized air from the storage tank to the second region to move the carriage and the nozzle in a second lateral direction; and
a third fluid passageway in fluid communication with the storage tank and the nozzle, the third fluid passageway providing pressurized air from the storage tank to the nozzle.

11. The system of claim 1, further comprising:
a first fluid passageway in fluid communication with the storage tank and a first nozzle of the panel-cleaner, and providing pressurized air from the storage tank to the first nozzle; and
a second fluid passageway in fluid communication with the storage tank and a second nozzle of the panel-cleaner, and providing pressurized air from the storage tank to the second nozzle.

12. The system of claim 11, further comprising:
a first valve disposed along the first fluid passageway and movable between an open position in which pressurized air is allowed to flow through the first fluid passageway and a closed position in which pressurized air is prevented from flowing through the first fluid passageway; and
a second valve disposed along the second fluid passageway and movable between an open position in which pressurized air is allowed to flow through the second fluid passageway and a closed position in which pressurized air is prevented from flowing through the second fluid passageway.

13. The system of claim 1, wherein the panel-cleaner includes a wiper blade that is in fluid communication with the storage tank, and wherein the wiper blade is operable between a first state in which compressed air from the storage tank inflates the wiper blade so that the wiper blade contacts the photovoltaic panels, and a second state in which compressed air is purged from the wiper blade so that the wiper blade is spaced apart from the photovoltaic panels.

14. A system for cleaning photovoltaic panels, the system comprising:
(a) a storage tank containing compressed air;
(b) a first actuator located at a first side of the photovoltaic panels and including a first housing and a first drive member at least partially disposed in the first housing and movable relative to the first housing;
(c) a second actuator located at a second side of the photovoltaic panels and including a second housing and a second drive member at least partially disposed in the second housing and movable relative to the second housing; and
(d) a panel-cleaner in fluid communication with the storage tank and coupled to the first drive member and the second drive member, the panel-cleaner directing compressed air from the storage tank to the photovoltaic panels to clean the photovoltaic panels.

15. The system of claim 14, wherein the first and second actuators are rodless pneumatic actuators.

16. The system of claim 14, wherein the panel-cleaner includes a plurality of nozzles in fluid communication with the storage tank, and wherein the plurality of nozzles generate a uniform sheet of laminar airflow to the photovoltaic panels to clean the photovoltaic panels.

17. The system of claim 16, wherein the plurality of nozzles are spaced apart from the photovoltaic panels 1-5 millimeters.

18. The system of claim 14, further comprising:
a sensor associated with the panel-cleaner and configured to detect objects or fluid located on the photovoltaic panels; and
a controller configured to execute programmed instructions stored in a nontransitory computer-readable medium, wherein the instructions include:
(i) obtaining data indicative of objects or fluid located on the photovoltaic panels from the sensor; and
(ii) automatically operating the first and second actuators and the panel-cleaner in response to the sensor detecting objects or fluid on the photovoltaic panels.

19. The system of claim 18, a remote mobile transmitter in communication with the controller and configured to send a cleaning command to the controller to execute the instructions.

* * * * *